United States Patent
Olson et al.

(10) Patent No.: US 10,633,990 B2
(45) Date of Patent: Apr. 28, 2020

(54) LOW BENDING STRESS STRUCTURAL STRUT AND ATTACHMENT

(71) Applicant: United Technologies Corporation, Farmington, CT (US)

(72) Inventors: Anders C. Olson, Bloomfield, CT (US); Nicholas W. Kantany, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 290 days.

(21) Appl. No.: 15/864,341

(22) Filed: Jan. 8, 2018

(65) Prior Publication Data

US 2019/0211697 A1 Jul. 11, 2019

(51) Int. Cl.
*F01D 9/04* (2006.01)
*F01D 9/02* (2006.01)

(52) U.S. Cl.
CPC ............... *F01D 9/041* (2013.01); *F01D 9/02* (2013.01); *F01D 9/04* (2013.01)

(58) Field of Classification Search
CPC ..... F01D 9/00; F01D 9/02; F01D 9/04; F01D 9/041; F01D 9/042; F01D 9/044
USPC ......................................................... 416/233
See application file for complete search history.

(56) References Cited

U.S. PATENT DOCUMENTS

| | | |
|---|---|---|
| 8,870,546 B2 | 10/2014 | Westergaard |
| 2001/0051095 A1 | 12/2001 | Schotsch et al. |
| 2012/0286109 A1 | 11/2012 | Clark et al. |
| 2016/0201490 A1 | 7/2016 | Scott |

OTHER PUBLICATIONS

EP search report for EP18205201.9 dated May 27, 2019.

*Primary Examiner* — Richard A Edgar
(74) *Attorney, Agent, or Firm* — Getz Balich LLC

(57) ABSTRACT

A vane strut assembly is disclosed, The vane strut assembly may include a first panel, a second panel, and a coupling mechanism that couples the first panel and the second panel to one another. The coupling mechanism may include a first fitting that is attached to the first panel, a second fitting that is attached to the second panel, and a cable disposed between the first fitting and the second fitting.

20 Claims, 5 Drawing Sheets

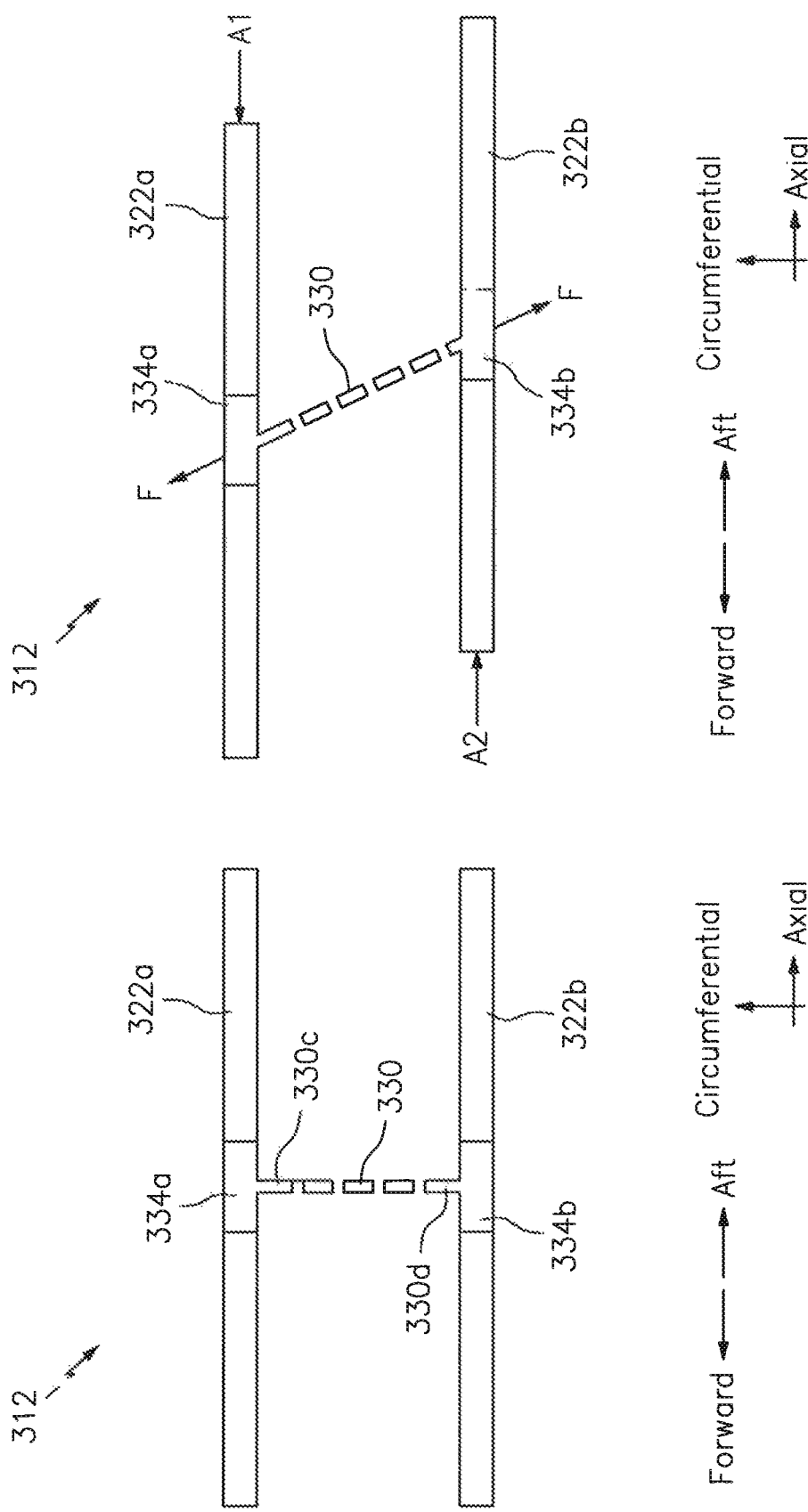

LOW BENDING STRESS STRUCTURAL STRUT AND ATTACHMENT

STATEMENT REGARDING FEDERALLY SPONSORED RESEARCH OR DEVELOPMENTS

This invention was made with government support under contract number FA8626-16-C-2139 awarded by the United States Air Force. The government has certain rights in the invention.

BACKGROUND

Engines, such as those which power aircraft and industrial equipment, may employ a compressor to compress air that is drawn into the engine and a turbine to capture energy associated with the combustion of a fuel-air mixture. An engine may include an exhaust section that exhausts gases resulting from the combustion from the engine. A turbine exhaust case (TEC) is a component that is typically included in the exhaust section. Various embodiments of a TEC are shown and described in United States patent application publication number 2016/0201490, the contents of which are incorporated herein by reference.

Referring to FIG. 2A, an example of a TEC 200 in accordance with the prior art is shown. The TEC 200 is shown arranged relative to an axial/longitudinal centerline 202 (where the centerline 202 may correspond to a centerline of an engine). Axial, radial, and circumferential directions are superimposed in FIG. 2A for reference purposes.

The TEC 200 includes a first, outer case 204 and a second, inner case 208. The cases 204 and 208 are coupled to one another by several vane strut assemblies 212 that are distributed around the circumference of the TEC 200. For purposes of illustrative/descriptive convenience, a given one of the vane strut assemblies 212 (identified as vane strut assembly 212a) is shown in a removed/extracted state/position relative to, e.g., the cases 204 and 208 in FIG. 2A.

Referring to FIGS. 2A-2B, the vane strut assembly 212a includes a first panel 222a and a second panel 222b. The panels 222a and 222b are circumferentially separated from one another. A pressurized cooling flow (denoted as P Bypass in FIG. 2B) is included in the region between the panels 222a and 222b to cool the vane strut assembly 212a. An exhaust gas flow/exhaust gases (denoted as P Gas Pass in FIG. 2B) is/are present between circumferentially adjacent vane strut assemblies 212.

The operating shape/profile of a vane strut assembly (e.g., the vane strut assembly 212a), which is partially dependent on the cooling flow P Bypass described above, impacts the aerodynamic behavior of the exhaust gases P Gas Pass flowing through the TEC 200. One or more rigid (cylindrical) pins (e.g., pin 230) connect the panels 222a and 222b to control relative tangential/circumferential deflection of the panels 222a and 222b (where the circumferential deflection is represented by a first load/deflection C1 on the first panel 222a and a second load/deflection C2 on the second panel 222b), where that control in turn influences the exhaust gases P Gas Pass. The loads/deflections C1 and C2 result in a tensile/reaction force F that is imposed on the pin 230.

Since relative axial deflections (e.g., deflections A1 and A2) and relative radial deflections (e.g., deflections R1 and R2) of the panels 222a and 222b can differ significantly during engine operation, a large bending stress may be induced in the pin(s). In particular, the axial deflections A1 and A2 and/or the radial deflections R1 and R2 may tend to induce a moment M in the panels 222a and 222b and the pin 230. As a result, the hardware shown in FIGS. 2A-2B is over-designed/over-engineered to accommodate/withstand the moment M. For example, additional material is included in the hardware (above a baseline amount of material) to ensure the reliability of the hardware (e.g., to ensure that the hardware remains operable).

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a vane strut assembly comprising: a first panel, a second panel, and a coupling mechanism that couples the first panel and the second panel to one another, the coupling mechanism including a first fitting that is attached to the first panel, a second fitting that is attached to the second panel, and a cable disposed between the first fitting and the second fitting. In some embodiments, the cable includes a plurality of strands that are braided relative to one another. In some embodiments, a first end of the cable is attached to the first fitting via crimping and welding. In some embodiments, a second end of the cable is attached to the second fitting via crimping and welding, the second end opposed to the first end. In some embodiments, the first fitting is attached to the first panel via at least one of a welded joint, a brazed joint, or a mechanical interference fit. In some embodiments, the first panel, the second panel, the first fitting, the second fitting, and the cable include nickel. In some embodiments, the cable accommodates a deflection between the first panel and the second panel within a range of one-sixteenth of an inch and one-quarter of an inch. In some embodiments, the cable accommodates a bending load based on a deflection of the first panel relative to the second panel such that a moment is not induced in the first panel or the second panel.

Aspects of the disclosure are directed to an exhaust case defined about a longitudinal centerline, comprising: a first case, a second case located radially outward of the first case relative to the centerline, and a plurality of vane strut assemblies distributed around a circumference of the first case that couple the first case and the second case, where a first vane strut assembly of the plurality of vane strut assemblies includes a first panel, a second panel, and a coupling mechanism that couples the first panel and the second panel to one another, the coupling mechanism including a first fitting that is attached to the first panel, a second fitting that is attached to the second panel, and a cable disposed between the first fitting and the second fitting. In some embodiments, the cable includes a plurality of strands that are braided relative to one another. In some embodiments, a first end of the cable is attached to the first fitting via crimping and welding. In some embodiments, a second end of the cable is attached to the second fitting via crimping and welding, the second end opposed to the first end. In some embodiments, the first fitting is attached to the first panel via at least one of a welded joint, a brazed joint, or a mechanical interference fit. In some embodiments, the first fitting, the second fitting, and the cable include nickel. In some embodiments, the cable accommodates a deflection between the first panel and the second panel within a range of one-sixteenth of an inch and one-quarter of an inch. In some embodiments, the cable accommodates a bending load based on a deflection of the first panel relative to the second panel such that a moment is not induced in the first panel or the second panel.

Aspects of the disclosure are directed to a gas turbine engine defined about a longitudinal centerline comprising: a compressor section, a combustor section, a turbine section, and an exhaust section that includes a first case, a second case located radially outward of the first case relative to the centerline, and a plurality of vane strut assemblies distributed around a circumference of the first case that couple the first case and the second case, wherein a first vane strut assembly of the plurality of vane strut assemblies includes a first panel, a second panel, a first fitting that is attached to the first panel, a second fitting that is attached to the second panel, and a braided cable disposed between the first fitting and the second fitting. In some embodiments, the cable accommodates a bending load based on at least one of an axial deflection or a radial deflection of the first panel relative to the second panel such that a moment is not induced in the first panel or the second panel. In some embodiments, a pressurized cooling flow from the compressor section is provided in a region between the first panel and the second panel. In some embodiments, exhaust gases output from the turbine section are present between the first vane strut assembly and a second vane strut assembly of the plurality of vane strut assemblies.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

FIG. 3A illustrates a vane strut assembly in accordance with aspects of this disclosure.

FIG. 3B illustrates the vane strut assembly of FIG. 3A when panels of the vane strut assembly are subjected to relative axial loads/deflections.

DETAILED DESCRIPTION

Figure 1:
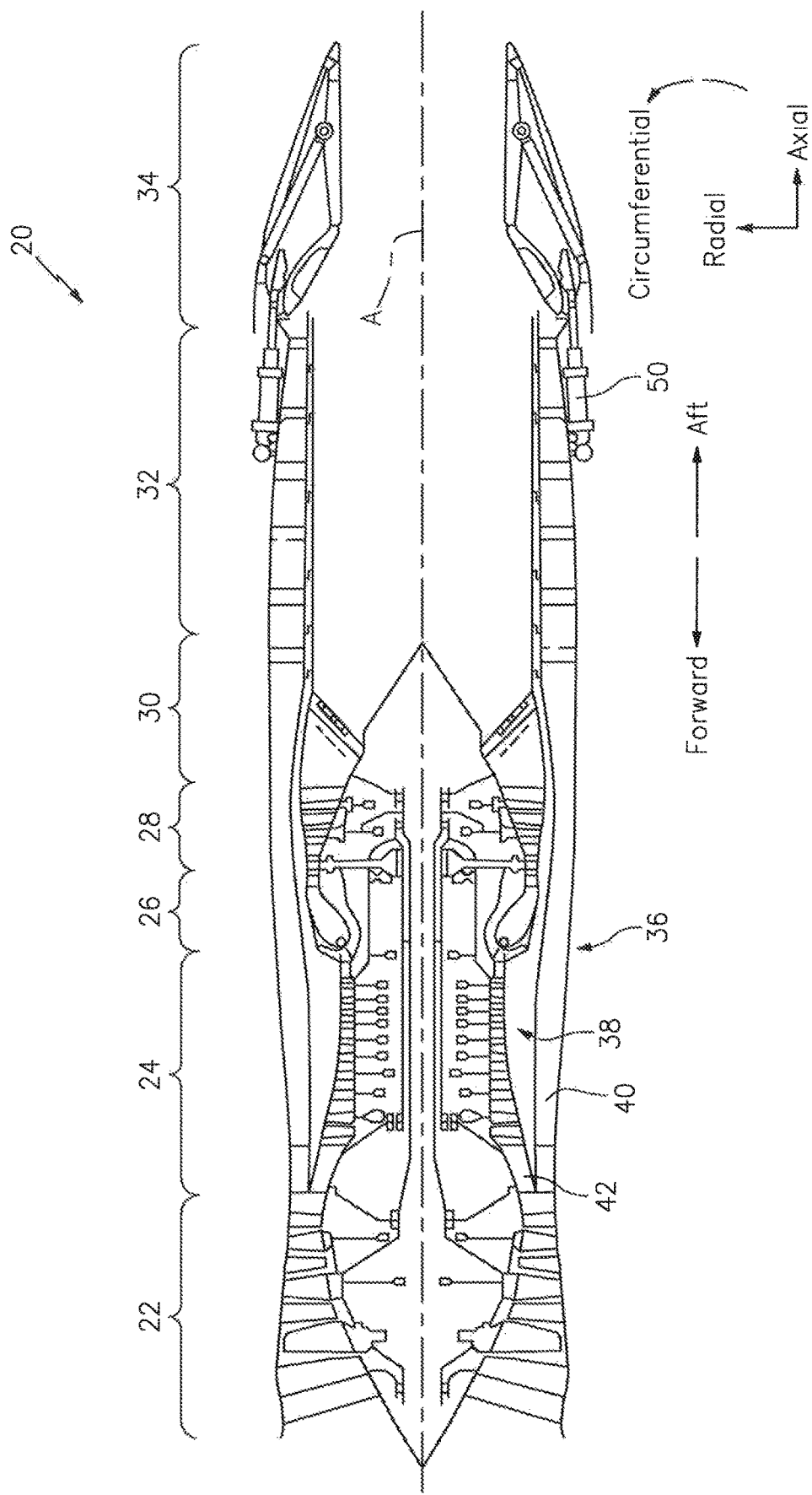
FIG. 1 is a side cutaway illustration of a gas turbine engine that incorporates an exhaust section.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of this disclosure, apparatuses, systems, and methods are described for controlling deflection (e.g., circumferentially-oriented deflection) between panels of a vane strut assembly. In some embodiments, the panels may be coupled to one another via a braided cable/wire. One or more ends of the cable may be coupled to a fitting. A fitting may be coupled (e.g., attached) to a panel.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust section 32, and a nozzle section 34 along a central longitudinal engine axis A.

An outer structure 36 and an inner structure 38 define a generally annular secondary airflow path 40 around a core primary airflow path 42. Various structure and modules may define the outer structure 36 and the inner structure 38 which essentially define an exoskeleton to support the rotational hardware therein.

Air that enters the fan section 22 is divided between a core primary airflow through the core primary airflow path 42 and a secondary airflow through a secondary airflow path 40. The core primary airflow passes through the combustor section 26, the turbine section 28, then the augmenter section 30 where fuel may be selectively injected and burned to generate additional thrust through the nozzle section 34.

The secondary airflow may be utilized for a multiple of purposes to include, for example, cooling and pressurization. The secondary airflow as defined herein is any airflow different from the core primary airflow. The secondary airflow may ultimately be at least partially injected into the core primary airflow path 42 adjacent to the exhaust section 32 and the nozzle section 34.

FIG. 1 represents one possible configuration for an engine. Aspects of the disclosure may be applied in connection with other environments, including additional configurations for gas turbine engines. Aspects of the disclosure may be applied in connection with geared or non-geared engines.

Figure 2A:
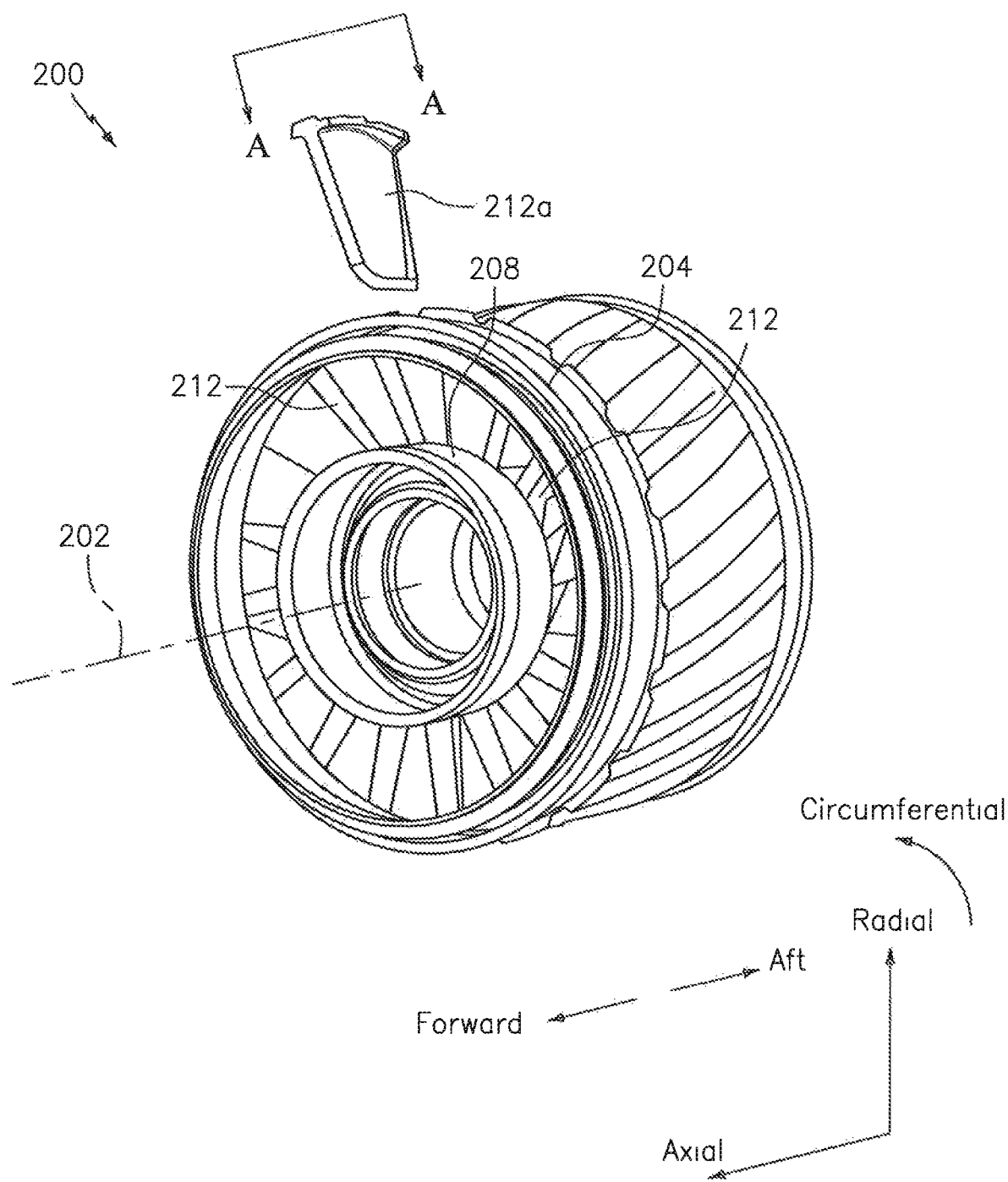
FIG. 2A illustrates a turbine exhaust case (TEC) that includes vane strut assemblies in accordance with the prior art.
Figure 2B:
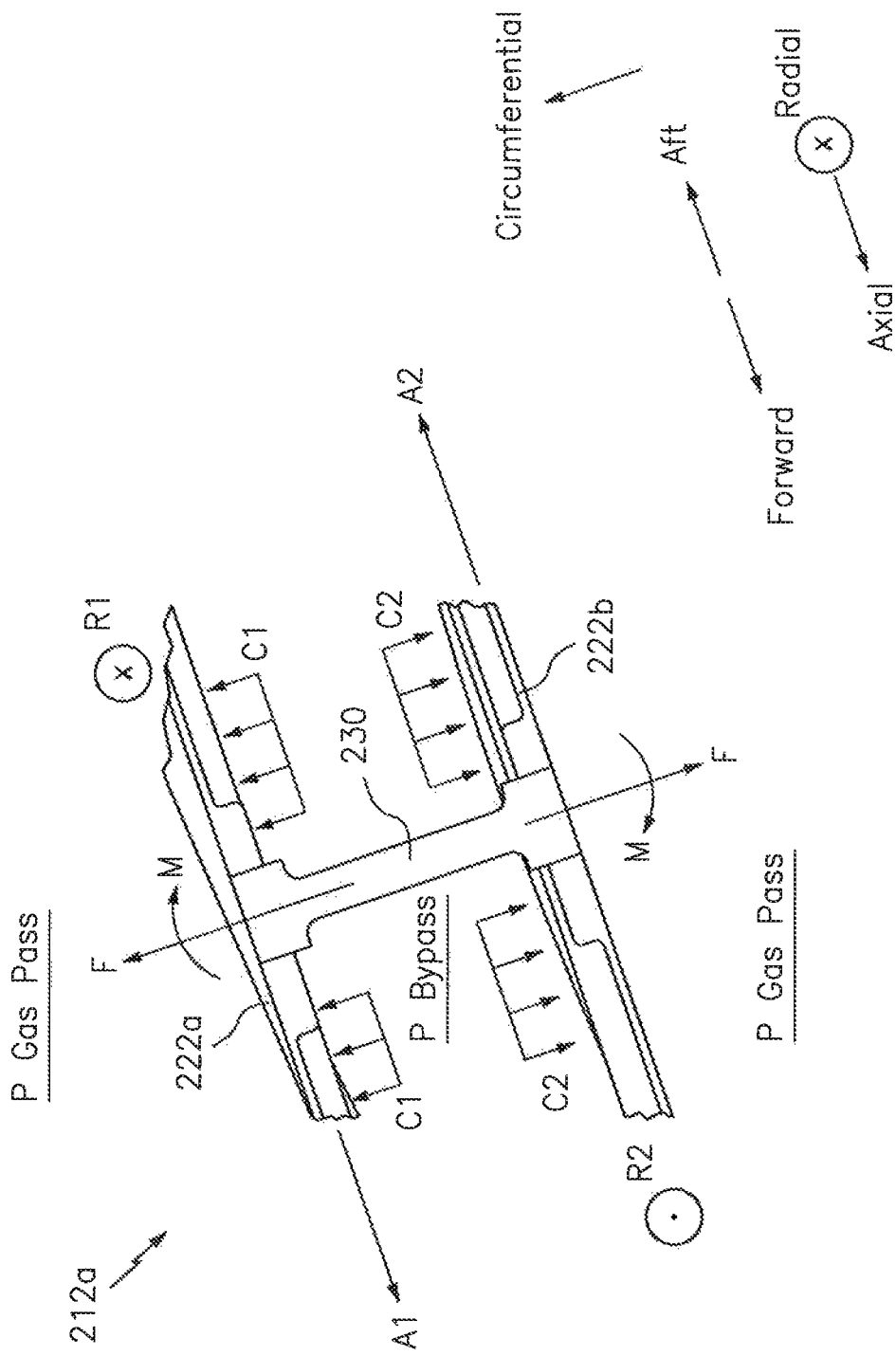
FIG. 2B illustrates a vane strut assembly of FIG. 2A taken about the line A-A of FIG. 2A.

The exhaust section 32 may include a turbine exhaust case (TEC). As described above, a TEC may include one or more vane strut assemblies that may be used to couple a first (e.g., outer) case and a second (e.g., inner) case. Referring to FIG. 3A, a vane strut assembly 312 in accordance with aspects of this disclosure is shown. The vane strut assembly 312 may include a first panel 322*a* and a second panel 322*b*. The first and second panels 322*a* and 322*b* may correspond to the first and second panels 222*a* and 222*b* (see FIG. 2B), which is to say that aspects of the disclosure (inclusive of the mechanisms used to couple the panels described herein) may be applied to legacy/existing panels.

The panels 322*a* and 322*b* may be different from the panels 222*a* and 222*b*. For example, the panels 322*a* and 322*b* may differ from the panels 222*a* and 222*b* in terms of size/dimension (e.g., the panels 322*a* and 322*b* may be smaller than the panels 222*a* and 222*b*).

The panels 322*a* and 322*b* may be made of one or more materials. For example, the panels 322*a* and 322*b* may be made of a nickel alloy in some embodiments.

Figure 3C:
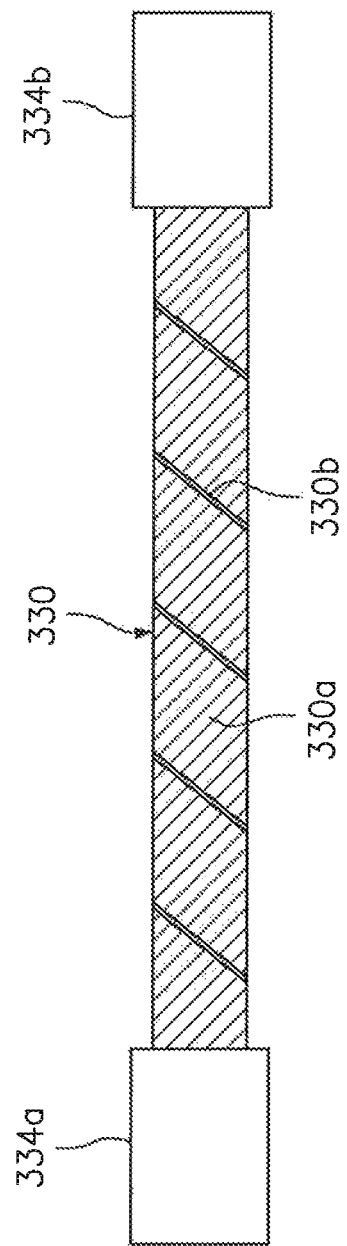
FIG. 3C illustrates a coupling mechanism of the vane strut assembly of FIG. 3A, the coupling mechanism including a cable and fittings.

The vane strut assembly 312 may include one or more braided cables/wires, such as for example a cable 330. Referring to FIGS. 3A and 3C, the cable 330 may include one or more strands, such as for example strands 330*a* and 330*b*. One or more parameters of the cable 330, such as for example a particular count of strands, a dimension of the strands, and a particular pattern (e.g., weave/braid/coil pattern of the strands), that are used in a given embodiment may be selected to accommodate one or more requirements.

The parameters may influence the capabilities/performance of the cable 330. For example, a smaller cable may be more compliant (thereby accommodating greater bending/moment) but may be less capable of accommodating load (e.g., force F in FIG. 3B). Accordingly, a trade-off may be made in a given application environment in terms of compliance versus load accommodation. In some embodiments, the trade-off may be made to accommodate a relative deflection between the panels 322a and 322b within a range of one-sixteenth of an inch (approximately 1.5 millimeters) and one-quarter of an inch (approximately 6.4 millimeters). Such a range may be typical of deflections experienced by the panels over an operating envelope of an engine.

The cable 330 (e.g., the strands 330a and/or the strands 330b) may be made of one or more materials. In the context of use in an engine, the cable 330 may be made of nickel.

A first end 330c of the cable 330 may be coupled to a first fitting 334a. For example, the first end 330c may be subject to crimping (e.g., the first fitting 334a may be clamped down upon the first end 330c). In some embodiments, the first end 330c and the first fitting 334a may be welded or brazed to one another.

A second end 330d of the cable 330 (where the second end 330d is opposed to the first end 330c) may be coupled to a second fitting 334b. For example, the second end 330d may be subject to crimping (e.g., the second fitting 334b may be clamped down upon the second end 330d). In some embodiments, the second end 330d and the second fitting 334b may be welded or brazed to one another.

The fittings 334a and 334b may be made of one or more materials. For example, the fittings 334a and 334b may be made of nickel.

The first fitting 334a may be coupled (e.g., attached) to the first panel 322a via one or more techniques, e.g., via a welded joint, a brazed joint, or a mechanical interference/press fit. The second fitting 334b may be coupled (e.g., attached) to the second panel 322b via one or more techniques, e.g., via a welded joint, a brazed joint, or a mechanical interference/press fit.

FIG. 3B illustrates the vane strut assembly 312 of FIG. 3A after the panels 322a and 322b have been subjected to relative axial deflections/displacements/loads A1 and A2, respectively. As shown, the relative deflections A1 and A2 may impart a (tensile) force F on, e.g. the cable 330. This force F in FIG. 3B may be comparable to the force F imposed on the pin 230 in FIG. 2B. However, in FIG. 3B a bending moment might not be induced in the panels 322a and 322b; the cable 330 may accommodate a bending load and may avoid inducing a moment in the panels 322a and 322b. This may be contrasted with the moment M induced in the panels 222a and 222b and the pin 230 as reflected in FIG. 2B.

As described above, the cable 330 and the fittings 334a and 334b may be used to couple (e.g., attach/connect) the panels 322a and 322b. The cable 330 and the fittings 334a and 334b may be used in lieu of a pin (e.g., the pin 230 of FIG. 2B). The cable 330 and the fittings 334a and 334b may provide relative circumferential stiffness between the panels 322a and 322b, while providing little resistance in bending (due to relative axial or radial motion/deflection), thereby controlling circumferential deflections of the panels 322a and 322b and reducing (e.g., minimizing or even completely avoiding) bending stress in the panels 322a and 322b.

Technical effects and benefits of this disclosure may provide for an enhancement in terms of controlling circumferential deflection between panels of a vane strut assembly while reducing (e.g., minimizing) the weight of the vane strut assembly. A coupling mechanism (e.g., a cable and fittings) of the panels may be sized smaller than a rigid pin because the mechanism may carry little, if any, bending/moment-based stress. A reduction in bending stress realized by a mechanism of this disclosure may result in a reduction in a count of mechanisms that are needed. Options for manufacture and assembly of a vane strut assembly in accordance with aspects of this disclosure are more numerous than those available in connection with conventional vane strut assemblies, thereby affording cost-reduction opportunities. As the mechanism may reduce (and even potentially avoid imparting) bending loads into the panels, panel sizes may be reduced at the point/location of attachment of the panels to the coupling mechanism, thereby providing weight savings.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A vane strut assembly comprising:
    a first panel;
    a second panel; and
    a coupling mechanism that couples the first panel and the second panel to one another, the coupling mechanism including
        a first fitting that is attached to the first panel;
        a second fitting that is attached to the second panel; and
        a cable disposed between the first fitting and the second fitting.

2. The vane strut assembly of claim 1, wherein the cable includes a plurality of strands that are braided relative to one another.

3. The vane strut assembly of claim 1, wherein a first end of the cable is attached to the first fitting via crimping and welding.

4. The vane strut assembly of claim 3, wherein a second end of the cable is attached to the second fitting via crimping and welding, the second end opposed to the first end.

5. The vane strut assembly of claim 1, wherein the first fitting is attached to the first panel via at least one of a welded joint, a brazed joint, or a mechanical interference fit.

6. The vane strut assembly of claim 1, wherein the first panel, the second panel, the first fitting, the second fitting, and the cable include nickel.

7. The vane strut assembly of claim 1, wherein the cable accommodates a deflection between the first panel and the second panel within a range of one-sixteenth of an inch and one-quarter of an inch.

8. The vane strut assembly of claim 1, wherein the cable accommodates a bending load based on a deflection of the first panel relative to the second panel such that a moment is not induced in the first panel or the second panel.

9. An exhaust case defined about a longitudinal centerline, comprising:
    a first case;
    a second case located radially outward of the first case relative to the centerline; and a plurality of vane strut assemblies distributed around a circumference of the first case that couple the first case and the second case, wherein a first vane strut assembly of the plurality of vane strut assemblies includes
- a first panel;
- a second panel; and
- a coupling mechanism that couples the first panel and the second panel to one another, the coupling mechanism including
  - a first fitting that is attached to the first panel;
  - a second fitting that is attached to the second panel; and
  - a cable disposed between the first fitting and the second fitting.

10. The exhaust case of claim 9, wherein the cable includes a plurality of strands that are braided relative to one another.

11. The exhaust case of claim 9, wherein a first end of the cable is attached to the first fitting via crimping and welding.

12. The exhaust case of claim 11, wherein a second end of the cable is attached to the second fitting via crimping and welding, the second end opposed to the first end.

13. The exhaust case of claim 9, wherein the first fitting is attached to the first panel via at least one of a welded joint, a brazed joint, or a mechanical interference fit.

14. The exhaust case of claim 9, wherein the first fitting, the second fitting, and the cable include nickel.

15. The exhaust case of claim 9, wherein the cable accommodates a deflection between the first panel and the second panel within a range of one-sixteenth of an inch and one-quarter of an inch.

16. The exhaust case of claim 9, wherein the cable accommodates a bending load based on a deflection of the first panel relative to the second panel such that a moment is not induced in the first panel or the second panel.

17. A gas turbine engine defined about a longitudinal centerline comprising:
- a compressor section;
- a combustor section;
- a turbine section; and
- an exhaust section that includes a first case, a second case located radially outward of the first case relative to the centerline, and a plurality of vane strut assemblies distributed around a circumference of the first case that couple the first case and the second case, wherein a first vane strut assembly of the plurality of vane strut assemblies includes
- a first panel;
- a second panel;
- a first fitting that is attached to the first panel;
- a second fitting that is attached to the second panel; and
- a braided cable disposed between the first fitting and the second fitting.

18. The gas turbine engine of claim 17, wherein the cable accommodates a bending load based on at least one of an axial deflection or a radial deflection of the first panel relative to the second panel such that a moment is not induced in the first panel or the second panel.

19. The gas turbine engine of claim 17, wherein a pressurized cooling flow from the compressor section is provided in a region between the first panel and the second panel.

20. The gas turbine engine of claim 19, wherein exhaust gases output from the turbine section are present between the first vane strut assembly and a second vane strut assembly of the plurality of vane strut assemblies.

* * * * *